United States Patent
Mugambi et al.

(10) Patent No.: US 12,174,947 B2
(45) Date of Patent: *Dec. 24, 2024

(54) DETECTING MALICIOUS BEHAVIOR IN A NETWORK USING SECURITY ANALYTICS BY ANALYZING PROCESS INTERACTION RATIOS

(71) Applicant: Fortinet, Inc., Sunnyvale, CA (US)

(72) Inventors: Ernest Mugambi, Dublin, CA (US); Partha Bhattacharya, Cupertino, CA (US); Gun Sumlut, Union City, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,076

(22) Filed: Oct. 31, 2023

(65) Prior Publication Data

US 2024/0070267 A1  Feb. 29, 2024

Related U.S. Application Data

(63) Continuation of application No. 16/835,195, filed on Mar. 30, 2020, now Pat. No. 11,836,247.

(51) Int. Cl.
*G06F 7/04* (2006.01)
*G06F 21/55* (2013.01)

(52) U.S. Cl.
CPC ...... *G06F 21/552* (2013.01); *G06F 2221/034* (2013.01)

(58) Field of Classification Search
CPC ........ G06F 21/50; G06F 21/55; G06F 21/552; G06F 21/56; G06F 21/566;
(Continued)

(56) References Cited

U.S. PATENT DOCUMENTS 8,615,805 B1 * 12/2013 Obrecht ................ G06F 21/566
                                                             713/188
9,098,333 B1 * 8/2015 Obrecht .................... G06F 9/50
(Continued)

OTHER PUBLICATIONS

Alexan et al, Analysis of Activity Detection Data Pre-processing, IEEE, Oct. 26, 2019, pp. 282-286. (Year: 2019).*

(Continued)

*Primary Examiner* — Philip J Chea
*Assistant Examiner* — Jenise E Jackson
(74) *Attorney, Agent, or Firm* — Jaffery Watson Hamilton & DeSanctis LLP

(57) ABSTRACT

Systems and methods for detecting malicious behavior in a network by analyzing process interaction ratios (PIRs) are provided. According to one embodiment, information regarding historical process activity is maintained. The historical process activity includes information regarding various processes hosted by computing devices of a private network. Information regarding process activity within the private network is received for a current observation period. For each process, for each testing time period of a number of testing time periods within the current observation period, a PIR is determined based on (i) a number of unique computing devices that hosted the process and (ii) a number of unique users that executed the process. A particular process is identified as potentially malicious when a measure of deviation of the PIR of the particular process from a historical PIR mean of the particular process exceeds a pre-defined or configurable threshold during a testing time period.

20 Claims, 11 Drawing Sheets

420

| Process | PIR Std | PIR Mean | Sample Size | PIR | Z-Score |
|---|---|---|---|---|---|
| P58 | 0 | 1 | 72 | 1.818 | 81.818 |
| P556 | 0.049 | 1.007 | 46 | 3.25 | 37.918 |
| P302 | 0 | 1 | 72 | 1.333 | 33.333 |
| P353 | 0 | 1 | 18 | 1.333 | 33.333 |
| P589 | 0 | 1 | 44 | 1.2 | 20 |
| P530 | 0.034 | 1.005 | 48 | 1.75 | 16.997 |
| P509 | 0.005 | 0.999 | 51 | 1.125 | 8.349 |
| P146 | 0 | 1.25 | 3 | 1.33 | 8.33 |
| P198 | 0.061 | 1.007 | 67 | 1.5 | 6.929 |
| P340 | 0.5 | 1.667 | 9 | 5 | 6.536 |

(58) Field of Classification Search
CPC .............. G06F 2221/034; H04L 63/14; H04L 63/1408; H04L 63/1425
See application file for complete search history.

(56) References Cited

U.S. PATENT DOCUMENTS

| | | | |
|---|---|---|---|
| 10,229,269 B1* | 3/2019 | Patton ................... | G06F 21/554 |
| 11,055,405 B1* | 7/2021 | Jin ........................ | G06F 21/552 |
| 2015/0013008 A1* | 1/2015 | Lukacs ................... | G06F 21/53 |
| | | | 726/24 |
| 2015/0248554 A1* | 9/2015 | Dumitru ................. | G06F 21/56 |
| | | | 718/1 |
| 2016/0269434 A1* | 9/2016 | DiValentin .......... | H04L 63/1441 |
| 2017/0286671 A1* | 10/2017 | Chari ................... | G06F 21/552 |

OTHER PUBLICATIONS

Crasto et al, Ubiquitous Computing in A Lab Environment, IEEE, Dec. 15, 2013, pp. 1-6. (Year: 2013).*

* cited by examiner

400

| Process Interaction Ratio (PIR) | PIR Events Day 1 | % Distribution | PIR Events Day 2 | % Distribution | PIR Events Day 3 | % Distribution | PIR Events Day 4 | % Distribution | PIR Events Day 5 | % Distrubuation | PIR Events Day 6 | % Distrubuation |
|---|---|---|---|---|---|---|---|---|---|---|---|---|
| 1 | 5239 | 88.02% | 5061 | 85.55% | 3747 | 86.02% | 1370 | 86.95% | 1177 | 84.43% | 5610 | 86.52% |
| <1.0 | 569 | 9.56% | 661 | 11.17% | 455 | 10.45% | 132 | 8.38% | 140 | 10.04% | 683 | 10.53% |
| >1.0 | 144 | 2.42% | 194 | 3.28% | 154 | 3.54% | 73 | 4.64% | 77 | 5.52% | 191 | 2.95% |
| Total | 5952 | | 5916 | | 4356 | | 1575 | | 1394 | | 6484 | |

| Standard Deviation | Event Counts | % |
|---|---|---|
| 0 | 9726 | 88.34% |
| <1.0 | 1271 | 11.54% |
| >1.0 | 13 | 0.12 |
| | 11010 | |

| Process | PIR Std | PIR Mean | Sample Size | PIR | Z-Score |
|---|---|---|---|---|---|
| P58 | 0 | 1 | 72 | 1.818 | 81.818 |
| P556 | 0.049 | 1.007 | 46 | 3.25 | 37.918 |
| P302 | 0 | 1 | 72 | 1.333 | 33.333 |
| P353 | 0 | 1 | 18 | 1.333 | 33.333 |
| P589 | 0 | 1 | 44 | 1.2 | 20 |
| P530 | 0.034 | 1.005 | 48 | 1.75 | 16.997 |
| P509 | 0.005 | 0.999 | 51 | 1.125 | 8.349 |
| P146 | 0 | 1.25 | 3 | 1.33 | 8.33 |
| P198 | 0.061 | 1.007 | 67 | 1.5 | 6.929 |
| P340 | 0.5 | 1.667 | 9 | 5 | 6.536 |

| hr | new Computer Hosting Process | New User Executing Process | No. of New User in Network | No. of new Computers in Network | Hourly PIR |
|---|---|---|---|---|---|
| 3 | 1 | 1 | 0 | 0 | 1 |
| 5 | 1 | 1 | 1 | 1 | 1 |
| 6 | 5 | 5 | 4 | 4 | 1 |
| 7 | 13 | 13 | 13 | 12 | 1 |
| 8 | 11 | 11 | 8 | 8 | 1 |
| 9 | 6 | 6 | 3 | 3 | 1 |
| 10 | 3 | 3 | 0 | 0 | 1 |
| 12 | 2 | 2 | 1 | 1 | 1 |
| 13 | 3 | 3 | 0 | 0 | 1 |
| 14 | 2 | 2 | 0 | 0 | 1 |
| 15 | 1 | 1 | 0 | 0 | 1 |
| 16 | 1 | 1 | 0 | 0 | 1 |
| 17 | 2 | 2 | 0 | 0 | 1 |
| 20 | 0 | 0 | 0 | 0 | 1 |
| 22 | 1 | 1 | 0 | 0 | 1 |
| 25 | 0 | 0 | 0 | 0 | 1 |
| 27 | 0 | 0 | 0 | 0 | 1 |
| 28 | 1 | 1 | 0 | 0 | 1 |
| 29 | 1 | 1 | 0 | 0 | 1 |
| 30 | 2 | 2 | 1 | 1 | 1 |
| 31 | 4 | 4 | 0 | 0 | 1 |
| 32 | 2 | 2 | 1 | 0 | 1 |
| 33 | 6 | 4 | 1 | 1 | 1.5 |
| 34 | 2 | 2 | 0 | 0 | 1 |
| 35 | 4 | 4 | 0 | 0 | 1 |
| 36 | 3 | 3 | 1 | 0 | 1 |
| 37 | 2 | 2 | 0 | 0 | 1 |
| 38 | 2 | 2 | 1 | 1 | 1 |
| 39 | 5 | 5 | 1 | 0 | 1 |
| 40 | 0 | 0 | 0 | 0 | 1 |
| 41 | 1 | 1 | 0 | 0 | 1 |
| 42 | 4 | 4 | 1 | 1 | 1 |
| 43 | 1 | 1 | 0 | 0 | 1 |
| 46 | 0 | 0 | 0 | 0 | 1 |
| 50 | 0 | 0 | 0 | 0 | 1 |
| 51 | 2 | 2 | 0 | 0 | 1 |
| 54 | 1 | 1 | 0 | 0 | 1 |
| 55 | 1 | 2 | 0 | 0 | 0.5 |
| 56 | 2 | 2 | 2 | 0 | 1 |
| 57 | 1 | 1 | 0 | 0 | 1 |
| 58 | 3 | 3 | 0 | 0 | 1 |
| 59 | 1 | 1 | 0 | 0 | 1 |
| 60 | 1 | 1 | 1 | 0 | 1 |
| 61 | 1 | 0 | 0 | 0 | 1 |
| 63 | 0 | 0 | 0 | 0 | 1 |
| 75 | 0 | 0 | 0 | 0 | 1 |
| 77 | 10 | 1 | 0 | 0 | 10 |
| 83 | 1 | 1 | 0 | 0 | 1 |

FIG. 4D

| time in sec | Hour | Process | User Id | Host Computer | in redteam? |
|---|---|---|---|---|---|
| 20411943 | 77 | P556 | U78@DOM1 | C1089 | YES |
| 20411949 | 77 | P556 | U78@DOM1 | C2039 | NO |
| 20411955 | 77 | P556 | U78@DOM1 | C2057 | YES |
| 20412116 | 77 | P556 | U78@DOM1 | C1382 | YES |
| 20412120 | 77 | P556 | U78@DOM1 | C1611 | YES |
| 20412127 | 77 | P556 | U78@DOM1 | C2254 | YES |
| 20412133 | 77 | P556 | U78@DOM1 | C742 | YES |
| 20412283 | 77 | P556 | U78@DOM1 | C1993 | NO |
| 20412550 | 77 | P556 | U78@DOM1 | C1139 | NO |
| 20412556 | 77 | P556 | U78@DOM1 | C1503 | YES |

450

| HOUR | P_COMPUTER | P_USER | NEW_USER | NEW_COMPUTER | HOURLY_PIR |
|---|---|---|---|---|---|
| 4 | 2 | 2 | 0 | 0 | 1 |
| 6 | 1 | 1 | 1 | 1 | 1 |
| 7 | 6 | 6 | 3 | 3 | 1 |
| 8 | 11 | 11 | 7 | 7 | 1 |
| 9 | 13 | 13 | 3 | 4 | 1 |
| 10 | 9 | 9 | 3 | 3 | 1 |
| 11 | 6 | 6 | 0 | 2 | 1 |
| 12 | 7 | 7 | 2 | 1 | 1 |
| 13 | 7 | 7 | 0 | 0 | 1 |
| 14 | 10 | 8 | 4 | 2 | 1.25 |
| 15 | 6 | 6 | 0 | 0 | 1 |
| 16 | 7 | 7 | 3 | 2 | 1 |
| 17 | 1 | 1 | 0 | 0 | 1 |
| 20 | 0 | 0 | 0 | 0 | 1 |
| 21 | 0 | 0 | 0 | 0 | 1 |
| 27 | 0 | 0 | 0 | 0 | 1 |
| 28 | 0 | 0 | 0 | 0 | 1 |
| 30 | 1 | 1 | 0 | 0 | 1 |
| 31 | 4 | 4 | 0 | 0 | 1 |
| 32 | 6 | 6 | 1 | 1 | 1 |
| 33 | 6 | 6 | 0 | 2 | 11 |
| 34 | 4 | 4 | 0 | 1 | 1 |
| 35 | 4 | 5 | 1 | 1 | 0.8 |
| 36 | 4 | 4 | 0 | 0 | 1 |
| 37 | 4 | 3 | 0 | 0 | 1.3333 |
| 38 | 2 | 2 | 0 | 0 | 1 |
| 39 | 14 | 14 | 3 | 5 | 1 |
| 40 | 2 | 3 | 0 | 0 | 0.6667 |
| 41 | 1 | 1 | 0 | 0 | 1 |
| 42 | 1 | 1 | 1 | 0 | 1 |
| 43 | 0 | 0 | 0 | 0 | 1 |
| 45 | 0 | 0 | 0 | 0 | 1 |
| 48 | 1 | 1 | 0 | 0 | 1 |
| 51 | 0 | 0 | 0 | 0 | 1 |
| 52 | 0 | 0 | 0 | 0 | 1 |
| 54 | 2 | 2 | 1 | 1 | 1 |
| 55 | 3 | 3 | 1 | 0 | 1 |
| 56 | 3 | 3 | 1 | 0 | 1 |
| 57 | 3 | 3 | 1 | 1 | 1 |
| 58 | 3 | 3 | 0 | 0 | 1 |
| 59 | 5 | 5 | 0 | 0 | 1 |
| 60 | 5 | 5 | 1 | 1 | 1 |
| 61 | 2 | 1 | 0 | 1 | 2 |
| 62 | 2 | 2 | 1 | 1 | 1 |
| 63 | 5 | 3 | 0 | 0 | 1.6667 |
| 64 | 1 | 1 | 0 | 0 | 1 |
| 71 | 1 | 1 | 1 | 0 | 1 |
| 72 | 1 | 1 | 0 | 0 | 1 |
| 75 | 0 | 0 | 0 | 0 | 1 |
| 76 | 0 | 0 | 0 | 0 | 1 |
| 77 | 10 | 1 | 0 | 0 | 10 |
| 79 | 1 | 1 | 1 | 0 | 1 |
| 80 | 0 | 0 | 0 | 0 | 1 |
| 83 | 1 | 1 | 0 | 0 | 1 |
| 86 | 0 | 0 | 0 | 0 | 1 |
| 87 | 0 | 0 | 0 | 0 | 1 |
| 94 | 1 | 1 | 1 | 0 | 1 |

| Hour | P_Computer | P_User | New_User | New_Computer | Hourly_PIR |
|---|---|---|---|---|---|
| 1 | 0 | 0 | 0 | 0 | 1 |
| 2 | 0 | 0 | 0 | 0 | 1 |
| 3 | 1 | 1 | 0 | 0 | 1 |
| 4 | 0 | 0 | 0 | 0 | 1 |
| 5 | 1 | 1 | 1 | 1 | 1 |
| 6 | 10 | 10 | 10 | 10 | 1 |
| 7 | 19 | 19 | 17 | 17 | 1 |
| 8 | 22 | 22 | 21 | 21 | 1 |
| 9 | 18 | 17 | 12 | 12 | 1 |
| 10 | 6 | 6 | 5 | 5 | 1 |
| 11 | 5 | 5 | 5 | 5 | 1 |
| 12 | 1 | 1 | 0 | 0 | 1 |
| 13 | 1 | 1 | 0 | 0 | 1 |
| 14 | 1 | 1 | 0 | 0 | 1 |
| 15 | 1 | 1 | 0 | 0 | 1 |
| 16 | 2 | 2 | 2 | 1 | 1 |
| 17 | 1 | 1 | 0 | 0 | 1 |
| 18 | 0 | 0 | 0 | 0 | 1 |
| 19 | 1 | 1 | 0 | 0 | 1 |
| 20 | 0 | 0 | 0 | 0 | 1 |
| 21 | 1 | 10 | 0 | 0 | 1 |
| 22 | 0 | 0 | 0 | 0 | 1 |
| 23 | 0 | 0 | 0 | 0 | 1 |
| 24 | 0 | 0 | 0 | 0 | 1 |
| 25 | 0 | 0 | 0 | 0 | 1 |
| 26 | 0 | 0 | 0 | 0 | 1 |
| 27 | 0 | 0 | 0 | 0 | 1 |
| 28 | 1 | 1 | 0 | 0 | 1 |
| 29 | 0 | 0 | 0 | 0 | 1 |
| 30 | 2 | 2 | 0 | 0 | 1 |
| 31 | 1 | 1 | 1 | 1 | 1 |
| 32 | 4 | 4 | 1 | 1 | 1 |
| 33 | 6 | 6 | 3 | 3 | 1 |
| 34 | 1 | 1 | 5 | 5 | 1 |
| 35 | 2 | 2 | 1 | 1 | 1 |
| 36 | 3 | 3 | 1 | 1 | 1 |
| 37 | 4 | 4 | 1 | 1 | 1 |
| 38 | 2 | 2 | 1 | 0 | 1 |
| 39 | 0 | 0 | 0 | 1 | 1 |
| 40 | 1 | 1 | 0 | 0 | 1 |
| 41 | 0 | 0 | 0 | 0 | 1 |
| 42 | 1 | 1 | 0 | 0 | 1 |
| 43 | 0 | 0 | 0 | 0 | 1 |
| 44 | 0 | 0 | 0 | 0 | 1 |
| 45 | 0 | 0 | 0 | 0 | 1 |
| 46 | 1 | 1 | 1 | 1 | 1 |
| 47 | 0 | 0 | 0 | 0 | 1 |
| 48 | 0 | 0 | 0 | 0 | 1 |
| 49 | 0 | 0 | 0 | 0 | 1 |
| 50 | 0 | 0 | 0 | 0 | 1 |
| 51 | 0 | 0 | 0 | 0 | 1 |
| 52 | 0 | 0 | 0 | 0 | 1 |
| 53 | 0 | 0 | 0 | 0 | 1 |
| 54 | 0 | 0 | 0 | 0 | 1 |
| 55 | 1 | 1 | 0 | 0 | 1 |
| 56 | 1 | 1 | 1 | 1 | 1 |
| 57 | 0 | 0 | 0 | 0 | 1 |
| 58 | 0 | 0 | 0 | 0 | 1 |
| 59 | 1 | 1 | 1 | 1 | 1 |
| 60 | 0 | 0 | 0 | 0 | 1 |
| 61 | 4 | 4 | 1 | 2 | 1 |
| 62 | 1 | 1 | 0 | 0 | 1 |
| 63 | 2 | 2 | 0 | 0 | 1 |
| 64 | 0 | 0 | 0 | 0 | 1 |
| 65 | 1 | 1 | 0 | 0 | 1 |
| 66 | 1 | 1 | 1 | 1 | 1 |
| 67 | 0 | 0 | 0 | 0 | 1 |
| 68 | 0 | 0 | 0 | 0 | 1 |
| 69 | 1 | 1 | 0 | 0 | 1 |
| 70 | 0 | 0 | 0 | 0 | 1 |
| 71 | 0 | 0 | 0 | 0 | 1 |
| 72 | 0 | 0 | 0 | 0 | 1 |
| 73 | 0 | 0 | 0 | 0 | 1 |
| 74 | 0 | 0 | 0 | 0 | 1 |
| 75 | 0 | 0 | 0 | 0 | 1 |
| 76 | 0 | 0 | 0 | 0 | 1 |
| 77 | 10 | 1 | 0 | 0 | 10 |
| 78 | 0 | 0 | 0 | 0 | 1 |
| 79 | 1 | 1 | 1 | 1 | 1 |
| 80 | 0 | 0 | 0 | 0 | 1 |
| 81 | 1 | 1 | 1 | 1 | 1 |
| 82 | 0 | 0 | 0 | 0 | 1 |
| 83 | 0 | 0 | 0 | 0 | 1 |
| 84 | 0 | 0 | 0 | 0 | 1 |
| 85 | 0 | 0 | 0 | 0 | 1 |
| 86 | 0 | 0 | 0 | 0 | 1 |
| 87 | 0 | 0 | 0 | 0 | 1 |
| 88 | 0 | 0 | 0 | 0 | 1 |
| 89 | 0 | 0 | 0 | 0 | 1 |
| 90 | 0 | 0 | 0 | 0 | 1 |
| 91 | 0 | 0 | 0 | 0 | 1 |
| 92 | 0 | 0 | 0 | 0 | 1 |
| 93 | 0 | 0 | 0 | 0 | 1 |
| 94 | 0 | 0 | 0 | 0 | 1 |
| 95 | 0 | 0 | 0 | 0 | 1 |

FIG. 4G

DETECTING MALICIOUS BEHAVIOR IN A NETWORK USING SECURITY ANALYTICS BY ANALYZING PROCESS INTERACTION RATIOS

RELATED APPLICATION

This application is a continuation of U.S. patent application Ser. No. 16/835,195, filed Mar. 30, 2020. The entirety of the aforementioned patent application is hereby incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2020-2023, Fortinet, Inc.

BACKGROUND

Field

Embodiments of the present invention generally relates to the fields of network security, security analytics, and user entity behavior analytics (UEBA). In particular, embodiments of the present invention relate to an automated system for detecting process misuse in an enterprise network by analyzing process interaction ratios.

Description of the Related Art

Vast enterprise networks running a variety of software on a number of computing devices become a ground for various opportunities for software misuse, which either aim at initiating an attack or propagating progression of an attack. Generally, malicious software runs under the guise of a common and widely accepted software program so that real process name and path of the malicious software is hidden in an effort to avoid software misuse detection as a result of analysis of the starting and stopping of various processes in the network.

Further, network administrators benefit from leeway in terms of software used as part of their work. Also, different users and computing devices in the network have different permissions in terms of what software they can run. Network administrators can set the permissions to ensure certain valuable assets are protected from malicious activity. Although the majority of software programs aid in efficient working, certain software programs can be misused by users with malicious intentions to cause detriment to normal working of the network.

In some examples, attackers find valuable assets by laterally moving about in the network using stolen credentials or installing certain software in various computing devices of the network. While process behavior changes can be monitored to identify fingerprints of lateral movement or ex-filtration to put a stop or slow down an attack progression, successfully running anomaly detection systems for monitoring process behavior is difficult because of the realities of the scale of enterprise networks including thousands of processes running in the network at any given time. Further, the dynamic nature of the network allows new processes to be introduced frequently by installing new software or versions of software, which are difficult to track.

Also, the vast scalability of the network allows computing devices and users, with different permissions to be introduced into the network all the time such that these permissions change regularly. In light of the above, even when malicious incidents are reported, network administrators require a great deal of context and correlation with other activities in order to validate and remediate the malicious incident, which in itself is time-consuming, cost-ineffective and prone to errors.

Therefore, there is a need for improvement in the area of security analytics to facilitate effective approaches for proactively detecting malicious incidents in enterprise networks.

SUMMARY

Systems and methods are described for detecting malicious behavior in a network by analyzing process interaction ratios. According to one embodiment, information regarding process activity within a network during one or more time periods is received by one or more computer systems. The information regarding process activity includes, for each time period of the one or more time periods, information indicative of which of multiple computing devices associated with the network executed which of multiple processes during the time period. For each process, for each testing time period of the one or more time periods, a process interaction ratio (PIR) is determined based on (i) a number of unique computing devices that executed the process and (ii) a number of unique users of the network that executed the process. A particular process of the multiple processes is identified as being potentially malicious based on a PIR z-score for the particular process exceeding a pre-defined or configurable threshold during a time period of the one or more time periods. The PIR z-score represents a measure of deviation of the PIR of the particular process from a historical PIR mean of the particular process.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A-G are exemplary tables representing various logs and computations in accordance with an embodiment of the present invention.

DETAILED DESCRIPTION

Figure 1A:
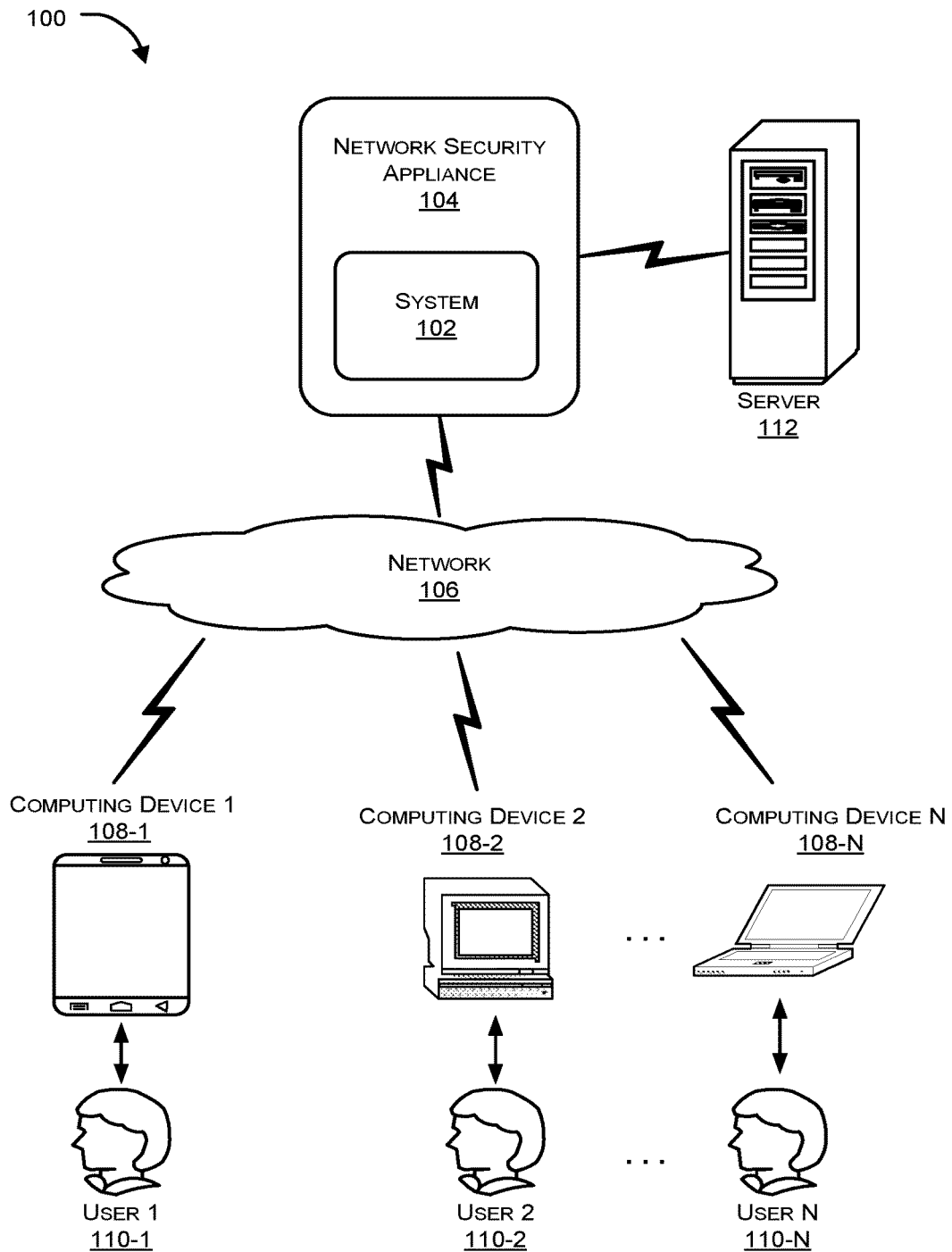
FIGS. 1A-B illustrate network architectures in which aspects of the present invention can be implemented in accordance with an embodiment of the present invention.

Systems and methods are described for detecting malicious behavior in a network by analyzing process interaction ratios. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various aspects of the present disclosure, a computer system running a security analytics program maintains information regarding historical process activity including information regarding various processes hosted by computing devices accessed by users. These computing devices are configured within a private network and the information regarding historical process activity is maintained during observation periods. In one embodiment, the computer system receives information regarding process activity within the private network for a current observation period. For each process, for each testing time period of a number of testing time periods within the current observation period, the security analytics program determines a process interaction ratio (PIR) between (i) a number of unique computing devices, which host the process and (ii) a number of unique users. The security analytics program then identifies a particular process as being potentially malicious when a PIR z-score for the particular process during a testing time period of the number of testing time periods exceeds a pre-defined or configurable threshold. The PIR z-score is a measure of deviation of the PIR of the particular process from a historical PIR mean of the particular process.

Figure 1B:
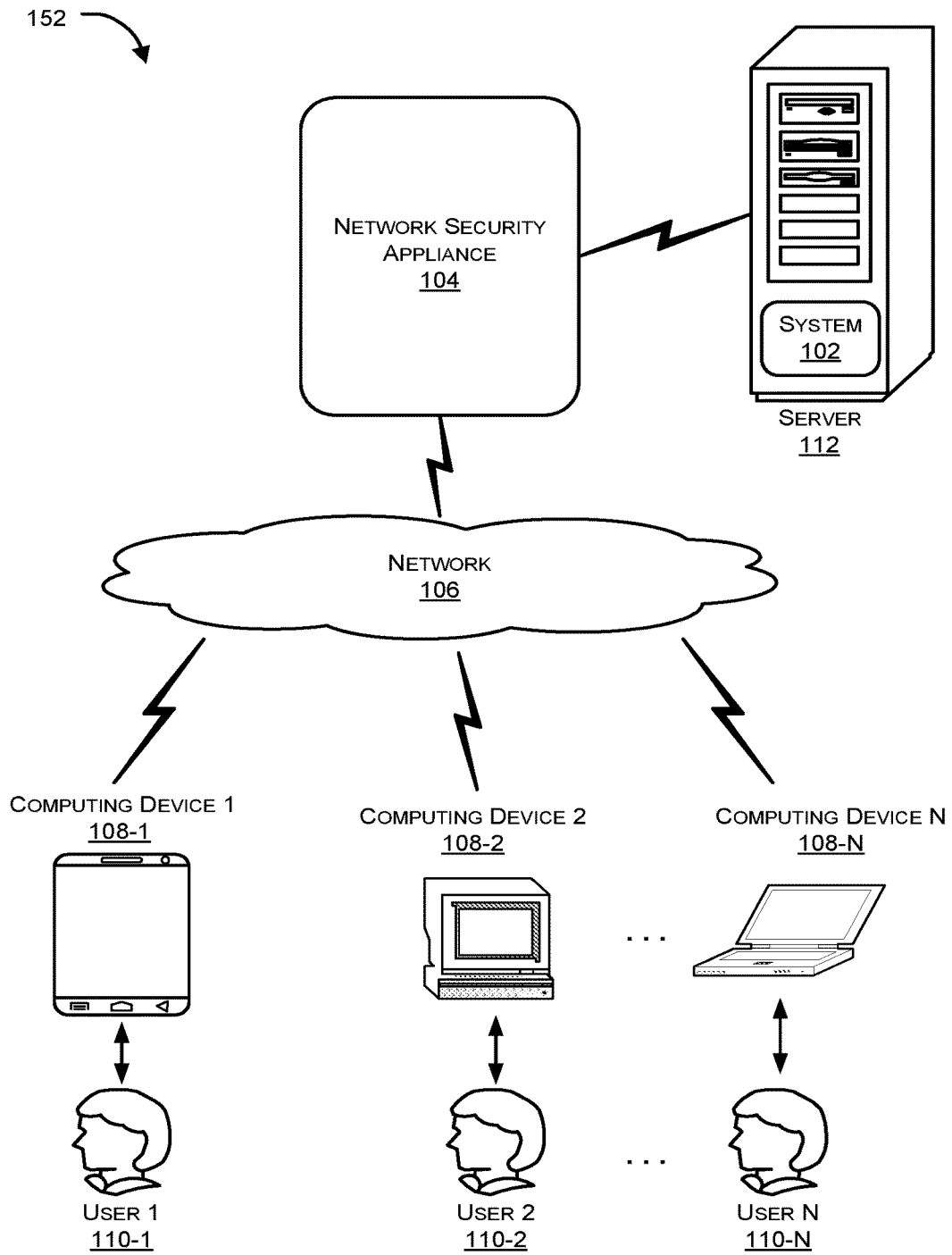

FIGS. 1A-B illustrate network architectures 100 and 150 in which aspects of the present invention can be implemented in accordance with an embodiment of the present invention.

In context of network architectures 100 and 150, a network security appliance 104 coupled with a server 112 can include a computer system 102 (which is also referred to as system 102, hereinafter) that runs a security analytics program to maintain information regarding historical process activity within a private network 106 (which is also referred to as network 106, hereinafter). Network 106 includes computing devices 108-1, 108-2, . . . , 108-N (which may be collectively referred to as computing devices 108, and may be individually referred to as computing device 108, hereinafter) that are accessed by users (which may be collectively referred to as users 110, and may be individually referred to as a user 110, hereinafter). The information regarding historical process activity can include information regarding various processes hosted by computing devices 108 during various observation periods.

In an embodiment, network security appliance 104 may be a Security Incident and Events Management (SIEM) appliance that may be part of a cloud-based security service. The cloud-based security service may be implemented within a public cloud, a private cloud or a hybrid cloud. Non-limiting examples of a cloud-based security service include the enSilo Cloud Service and FORTIGUARD security services available from assignee of the present invention.

Further, computing devices 108 associated with network 106 may include, but are not limited to, personal computers, workstations, desktop computers, smartphones, smart devices, web-enabled devices, hand-held devices, laptops, mobile devices, and the like. In one embodiment, network security appliance 104 may interact with users 110 through network 106 via their respective computing devices 108, for example, in the form of notifications or alerts via a user interface associated with computing devices 108.

Those skilled in the art will appreciate that, network 106 can be a wireless network, a wired network or a combination thereof that can be implemented as one of the various types of networks, such as an Intranet, a Local Area Network (LAN), a Wide Area Network (WAN), an Internet, and the like. Further, network 106 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, system 102 can receive information regarding process activity within network 106 for a current observation period that can be divided into a number of equal testing time periods (e.g., an hour or multiple hours). Responsive to receiving the information, for each process of various processes and for each testing time period of the number of testing time periods, system 102 may determine a PIR between (i) a number of unique computing devices 108 that host the process and (ii) a number of unique users 110 that have executed the process during the testing time period. For each process of the various processes, system 102 may also calculate a historical mean PIR for the process and a standard deviation of PIR for the process based on the information regarding historical process activity and PIRs calculated for the process at the equal testing time periods within the observation periods.

In one embodiment, system 102 then identifies a particular process from the various processes as being potentially malicious when a PIR z-score for the particular process during a testing time period exceeds a pre-defined or configurable threshold. The PIR z-score may represent a measure of deviation of the PIR of the particular process from the historical PIR mean of the particular process. In response to the identifying, system 102 may determine whether any computing device 108 or any user 110 that caused the PIR z-score for the particular process to exceed the predefined or configurable threshold was newly introduced into network 106. When any computing device 108 or any user 110 is newly introduced, system 102 may confirm the particular process to be malicious by generating a modified PIR for the particular process that excludes any newly introduced computing device 108 or any newly introduced users 110 and comparing the modified PIR to the PIR z-score.

After each observation period, system 102 may incorporate the information regarding process activity for the current observation period into the information regarding historical process activity maintained therein.

Figure 2:
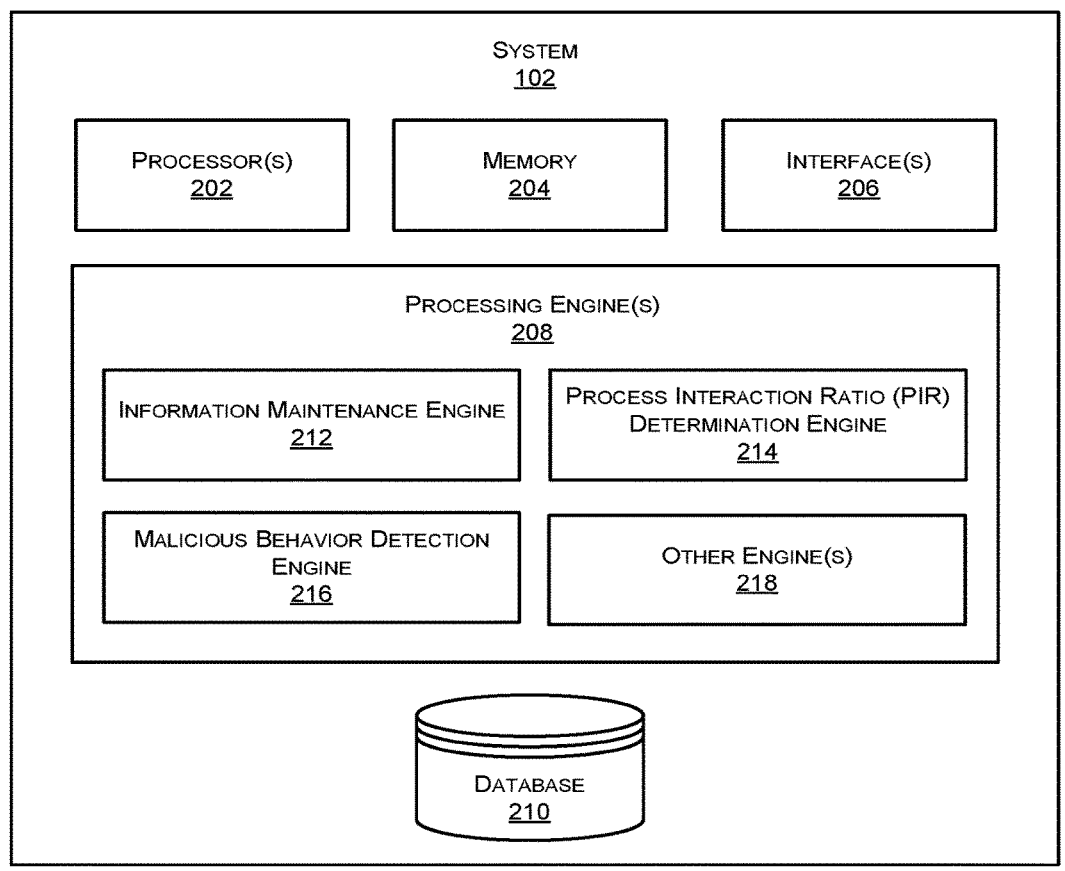
FIG. 2 is a block diagram illustrating functional components of a system in accordance with an embodiment of the present invention.

FIG. 2 is a block diagram 200 illustrating functional components of a system 102 in accordance with an embodiment of the present invention. Depending upon the particular implementation, system 102 may be implemented within a network security appliance or a server associated with a private network that manages computing devices associated with the private network. In one embodiment, functionality associated with system 102 may operate and be delivered as part of a cloud-based service.

In the context of the present example, system 102 can include one or more processing resources (e.g., processor(s) 202). Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the system 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

System 102 can also include one or more interface(s) 206. Interface(s) 206 may include a variety of interfaces, for example, interfaces for data input and output devices, referred to as I/O devices, storage devices, and the like. Interface(s) 206 may facilitate communication of system 102 with various devices coupled to system 102. Interface(s) 206 may also provide a communication pathway for one or more components of system 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, system 102 can include the machine-readable storage medium storing the instructions and the processing resource to execute the instructions, or the machine-readable storage medium may be separate but accessible to system 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include an information maintenance engine 212, a PIR determination engine 214, a malicious behavior detection engine 216, and other engine(s) 218. Other engine(s) 218 can implement functionalities that supplement applications or functions performed by system 102 or processing engine(s) 208.

According to an embodiment, information maintenance engine 212 maintains information regarding historical process activity within the private network including computing devices accessed by various users. In one embodiment, the information regarding historical process activity includes information regarding processes hosted by the computing devices during a number of observation periods, where each observation period can be divided into equal time periods (e.g., of one hour or multiple hours). Information maintenance engine 212 may be responsible for receiving information regarding process activity within the network for a current observation period that can also be divided into a number of equal testing time periods (e.g., of one hour or multiple hours).

In various embodiments described herein process behavior tracking involves the use of a measure referred to herein as a PIR that represents a ratio of the number of hosts or computing devices in which a process is executed to number of users that execute the process. An example equation for calculating the PIR for a particular process is as follows:

$$\text{process interaction ratio } (PIR) = \frac{\text{no. of unique computing devices}}{\text{no. of unique users}} \quad \text{EQ \#1}$$

In accordance with EQ #1, when PIR is above 1.0, it means that a user most likely has initiated the same process across more than one machine. When PIR falls below 1.0, this indicates users are triggering processes on shared machines. Both scenarios could be indicators of potential malicious behavior especially if there is a rapid increase of machines or users over a short time period. While, high or low PIR values alone are not inherently bad, sudden unprecedented down or upswings could well be indicators of attacks and at the very least should be presented to personnel who can analyze them further.

In accordance with one embodiment, responsive to receiving the information regarding process activity within the network for a current observation period, the PIR determination engine 214 may be responsible for determining PIRs for all processes. For example, for each process and for each testing time period within the current observation period, the PIR determination engine 214 may determine the PIR based on the number of unique computing devices that host the process and the number of unique users that executed the process during the testing time period in accordance with EQ #1.

Those skilled in the art will appreciate the PIRs are expected to be quite stable over time and therefore should only change marginally from time to time. As such, any large deviation in a PIR for a particular process may represent a rare and significant change in behavioral characteristics within the network that might be attributed to malicious activity. Embodiments of the present disclosure provide a statistical model of process behavior extracted from historical process activity within the network, which can be used to detect such deviations in PIR values and hence potential malicious activity. In one embodiment, when verifying potential anomalous activity, changes in PIR that are determined to have been caused by newly introduced assets or users in the network may be excluded.

Malicious behavior detection engine 216 may be responsible for identification of potentially malicious behavior within the network. In one embodiment, the malicious behavior detection engine 216 may calculate a historical mean PIR for each process and a standard deviation of the PIRs for each process based on the information regarding historical process activity and the PIRs calculated for the process at equal testing time periods within the observation periods. Potentially malicious behavior may then be identified by assuming the historical PIR follows a statistical distribution and using this distribution to identify periodic (e.g., hourly) PIRs that are extremely large and hence anomalous. In one embodiment malicious behavior engine 216 may identify a level of anomalousness by quantifying the level of PIR deviation based on a z-score statistical measure (which may be referred to herein as the PIR z-score). There might be some cases where the PIR z-score might be biased if the data upon which it is based is not normally distributed. In those cases, techniques, such as Chebyshev inequality, may be used to ascertain that the PIR z-score is quantifiably high enough to meet the anomaly criteria.

Those skilled in the art will appreciate the PIR z-score is a measure of deviation of the PIR of the particular process from the historical PIR mean of the particular process. Therefore, in one embodiment, malicious behavior detection engine 216 identifies a particular process as being potentially malicious when the PIR z-score for the particular process during a testing time period exceeds a pre-defined or configurable threshold. Furthermore, in response to identifying the potentially malicious process, malicious behavior detection engine 216 may determine whether any of the computing devices or the users that caused the PIR z-score for the particular process to exceed the predefined or configurable threshold were newly introduced into the network. If any of the computing devices or the users 110 are newly introduced, malicious behavior detection engine 216 can confirm the particular process to be malicious by generating a modified PIR for the particular process that excludes any newly introduced computing device or any newly introduced user by comparing the modified PIR to the PIR z-score.

Information maintenance engine 212 may be responsible for incorporating the information regarding process activity for the current observation period into the maintained information regarding historical process activity. In one embodiment, the training time may be increased and the statistics may be updated until a maximum training period is reached at which point older training events may be aged out.

Figure 3A:
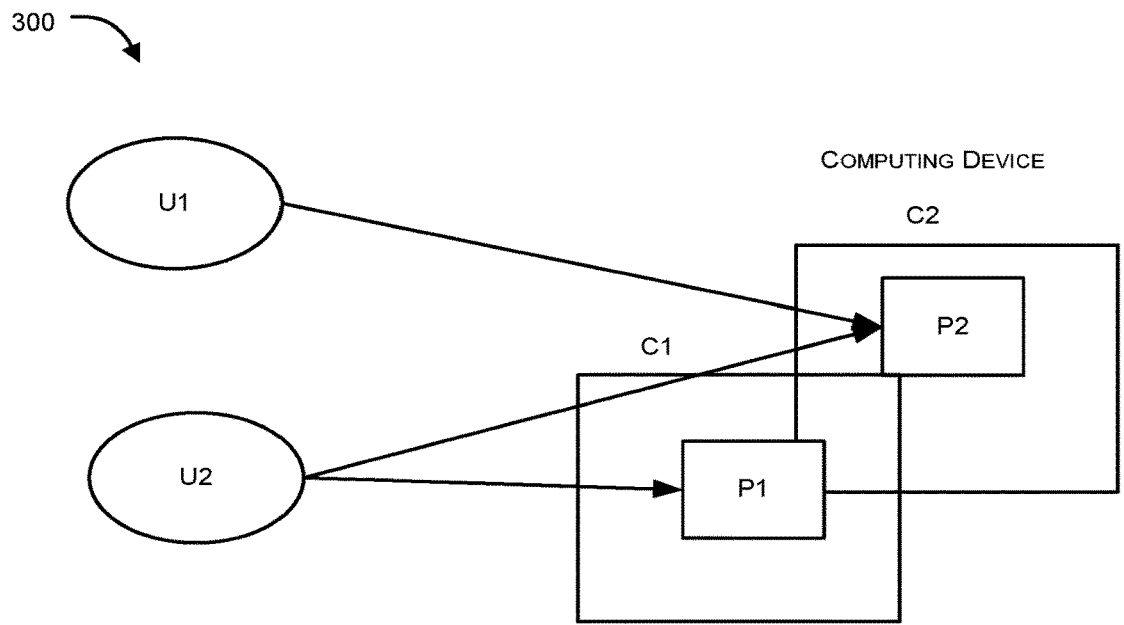
FIGS. 3A-B are block diagrams illustrating exemplary user-computer interactions from the point of view of processes.
Figure 3B:
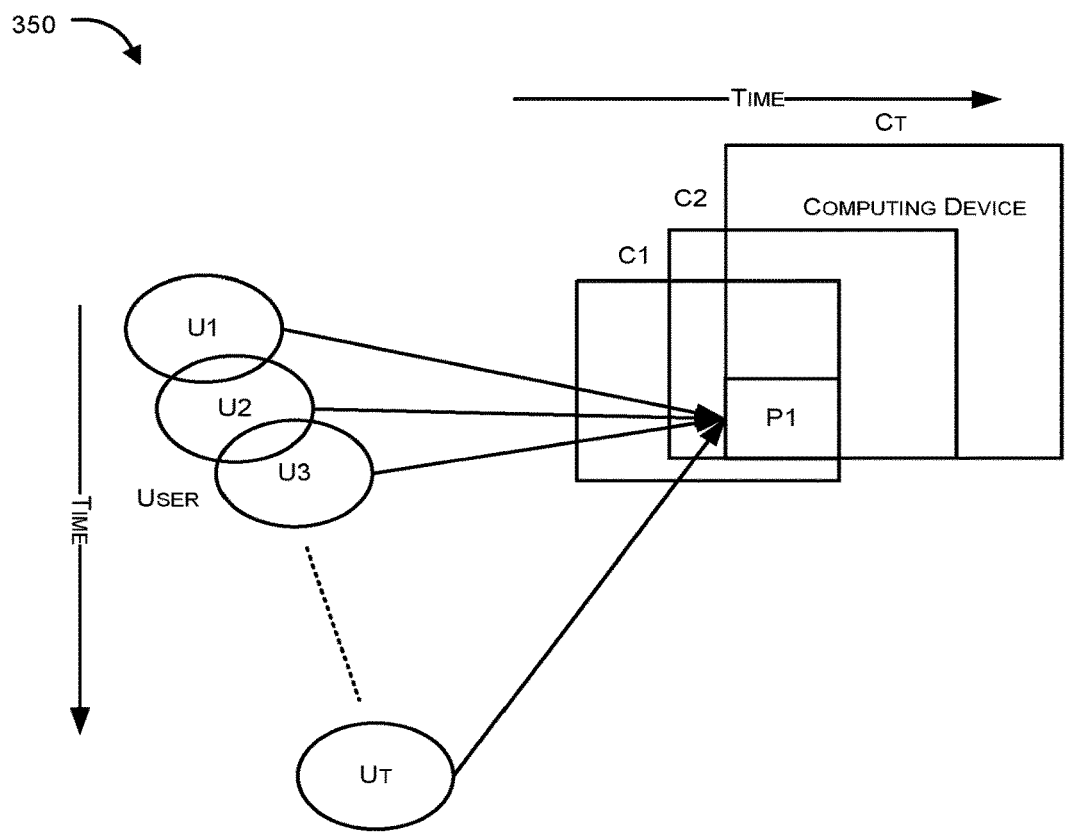
Figure 4E:

FIGS. 3A-B are block diagrams 300 and 350 illustrating exemplary user-computer interactions from the point of view of processes. In the context of the present example, block diagram 300 illustrates a schematic of users U1 and U2 working on their computing devices C1 and C2 on which processes P1 and P2 are running, respectively. Those skilled in the art will appreciate that a private network can generate an intricate network graph of users and computing devices as many users may share computing devices and initiate processes in an intertwined manner.

Considering user-computer interactions from the point of view of processes, block diagram 350 illustrates an abstraction that is centered on process P1 and user-computer interaction based on time duration t. Based on this abstraction, block diagram 350, a PIR that represents process behavior during time t can be calculated by dividing the number of computers that host an active process P1 by the number of users that have initiated the process P1 during time period t.

Modeling process PIR as described herein facilitates identification of multiple potential scenarios and combinations thereof. For example, a first scenario may involve users starting processes on computing devices that the users are not usually associated with or processes being executed on computing devices that have not executed such processes historically. Identification of the first scenario may be used to capture process footprint propagation to new computing devices. A second scenario may involve users initiating processes that they normally do not execute. Identification of the second scenario may be used to discover new behavior on the part of users.

For purposes of illustration, the above-described scenarios are elaborated upon with reference to three specific and non-limiting examples of how changes in PIR may be indicative of potential malicious activity in the network. For purposes of these examples, assume there are initially two users U1 and U2 that frequently start one process P1 on two computing devices C1 and C2.

In a first example, assume, U1 and U2 now start process P1 on C1, C2 and C3. Based on EQ #1, this causes the PIR of P1 to increase due to introduction of computing device C3. This increase in PIR may indicate the existence of a spoofed process (e.g., malicious software under the guise of P1) being executed on C3.

In a second example, U1, U2 and a new user U3 now start process P1 on C1 and C2. In accordance with EQ #1, this causes the PIR to go down due to introduction of new user U3 who was not previously associated with P1. This decrease in the PIR of P1 might represent U3 running malicious software under the guise of P1 on C1 and C2 (computing devices that U3 is not traditionally (historically) associated with).

In a third example, U1, U2 and U3 now start process P1 on C1, C2, C3, C4 and C5. Based on EQ #1, this activity causes the PIR for P1 to shoot up due to the proliferation of process starts on new computing devices C3, C4 and C5 by a new user U3 that has not previously been associated with computing devices C1 and C2 and process P1. The third example represents a change in both user and process behavior, which may be rare, but illustrates another potential indicator of potential malicious activity.

In various embodiments described herein, PIR is computed at equal time intervals. As explained further below, empirical evidence suggests a daily time interval provides quite stable results. In some examples described herein, PIR is calculated at hourly intervals. In this manner, larger numbers of samples are generated that lead to more statistically significant outcomes. Additionally, mean PIR and standard deviation of PIR may also be calculated based on the hourly calculated PIR values. Those skilled in the art will appreciate, while, for sake of brevity and for purposes of illustration, various examples described herein use hourly intervals, the intervals used may be longer or shorter depending upon the particular implementation.

One embodiment uses the mean PIR and the standard deviation PIR to identify every new occurrences of PIR for each process and determine its level of deviation using a z-score. An exemplary z-score can be computed as follows:

$$PIR\ z\_score = \frac{new\ PIR - PIR\ mean}{PIR\ standard\ deviation} \qquad EQ\ \#2$$

Those skilled in the art will appreciate that there could be numerous instances that identify high PIR scores where the processes at issue are not malicious. Therefore, embodiments of the present disclosure attempt to go a step further by definitively pointing out the highest probable cases where and when malicious events occurred. Further, flagging high PIR events caused by new computing devices or new users introduced into the network will reduce efficiency. Therefore, embodiments described herein, pinpoint intervals (e.g., hours) in which there is high certainty of malicious activity by consulting a table that stores all unique tuples of process name/path, computer-ID and User-ID. Using such a table, various embodiments can identify new occurrences of any user or computing device in the network. Significant deviation in PIR within a short duration of time can mean that either a disproportionate number of either users to computing devices or vice versa have started a process for the first time, which can be very suspicious. Instances in which many users and computing devices are introduced in the network and execute the same processes may not cause a spike in PIR as the computing devices and the users balance out. By capturing information regarding when these occurrences take place and/or by alerting administrators of such occurrences, administrators can be put in a better position to confirm and remediate the problem.

An example process for identifying hourly changes in PIR can be defined using following variables:

Fc—A count representing first-time computing devices hosting a process

Fu—A count representing first-time users starting a process

Nc—A count representing first-time computing devices introduced to the network

Nu—A count representing first-time users introduced to the network

According to one embodiment, for each and every hourly event, hourly changed in PIR may be identify by tracking values for variables Fc, Fu, Nc and Nu and using the computed values to determine a new variation of the PIR measure as follows:

$$modified\ hourly\ PIR = \frac{Fc - Nc}{Fu - Nu} \qquad EQ\ \#3$$

Based on EQ #3, hours where modified hourly PIR z-scores are statistically very high can be flagged as malicious and all the relevant information can be shared with the administrator.

FIGS. 4A-G are exemplary tables 400, 410, 420, 430, 440, 450 and 460 representing various logs and computations in accordance with an embodiment of the present invention. These tables include data and various PIR calculations relating to a Los Alamos National Laboratory (LANL) cybersecurity data set, referred to herein as the LANL data set. See, A. D. Kent, "Comprehensive, Multi-Source Cybersecurity Events," Los Alamos National Laboratory, http://dx.doi.org/10.17021/1179829, 2015. See also, A. D. Kent, "Cybersecurity Data Sources for Dynamic Network Research," in Dynamic Networks in Cybersecurity, 2015. The LANL data set contains 58 days of process data gathered from an enterprise network comprising 12,425 users, 17,684 computers and 62,974 processes. Testing on the LANL data set confirmed that the PIR is very consistent from one day to another. For example, table 400 shows the distribution of the PIR based on the processes tracked over a 6-day period. As noted above, PIR values greater than 1.0 indicates that a user most likely initiated the same process across more than one computing device, whereas a PIR less than 1.0 indicates that various users have triggered processes on shared computing devices. Both scenarios could be indicators of potentially malicious behavior especially if there is a rapid accumulation of computing devices or users over a short time period; however, those skilled in the art will appreciate that a high or low PIR value alone is not sufficient to indicate the existence of malicious activity. Instead, sudden unprecedented down or upswings in PIR values are more useful as indicators of attacks and at the very least should be detected and presented to an administrator who can analyze them further.

From table 400 containing the distribution of 6 days of process events from the LANL dataset, it is clear that an average of approximately 86.0% of the events have a PIR of 1.0, which means the same users are activating the same process on the same computing devices on a daily basis. Therefore, these events are most likely normal process events, which can be ignored to reduce the scope of events under investigation by close to 90%. Further, there are only about 3.0% of the events with PIR values greater than 1.0 for any given day. This may represent the best indicator of process abuse likelihood as it represents processes that are being activated on new computing devices and therefore have a higher likelihood of being malicious. Finally, there are about 10% of the events that have a PIR less than 1.0 on any given day.

In accordance with various embodiment, changes in PIR are tracked from one time period to another time period as these changes signify shifts in process behavior. Table 410 shows the standard deviation of PIR over a period of 8 days. From table 410, it appear 88.34% of processes did not change at all in terms of their respective PIRs going by their 0-magnitude in standard deviation. Meanwhile, 11.54% of the processes witnessed at maximum a doubling or a halving of PIR. The most significant changes in the PIR were the processes that had more than a doubling in PIR, which occurred in a very small cohort of processes (about 0.12%). Therefore, these results indicate there are very few instances of process behavior that can be actively tracked in order to catch most potential malicious processes in an enterprise network.

Table 420 shows results from running the various PIR calculations described herein on the LANL data set for process events collected for a seven-day period from over 30,000 events comprising 25000 users, 9700 computing devices and 11967 unique processes. The results constitute the topmost malicious events on day 3 based on PIR z-score, PIR and number of data points. PIR z-score is a measure of deviation of PIR from the historical PIR mean. A higher PIR z-score signifies that the PIR has increased significantly. For instance, a PIR z-score of 6.0 means that the PIR has increased six standard deviations above the historical PIR mean. PIR is a measure of how many computing devices ran a process during a particular interval as compared to a number of users that ran the process during the particular interval. A high PIR signifies that users are executing new processes in new computing devices, which could be an indicator of malicious activity. Further, PIR z-score, PIR standard deviation and PIR mean are based on the number of historical data points observed and are more reliable if calculated based on a large sample of data points. In an implementation, statistical values are based on at least 24 data points. P58, P556 and P530 are processes that show all the hallmarks of the criteria set forth above that were later verified to have malicious behavior. The results in table 420 are based on a daily calculation of PIR. In order to identify where the deviation begins more precisely, shorter PIR calculation intervals should be used. For example, it may be helpful to look at hourly changes in PIR for the identified processes.

Table 430 shows streams of hourly PIR for process P556. At the $77^{th}$ hour the PIR shoots up significantly to about 10. The events indicate that one new user executed process P556 on ten new computing devices that were not associated with the process before. It is pertinent to note that these computing devices were not new in the network. Because it is normal for the PIR to increase when a new computing device/user is introduced in a network, before raising an alert, one may wish to check whether an observed increase in PIR was as a result of the introduction of one or more new computing devices and/or one or more new users to the network at issue.

Table 440 shows 10 new events behind the elevated PIR. The events that match with list of malicious events were tagged. The User ID (U78@DOM1) was a new user that had not executed P556 before and all host computing devices in table 440 were hosting the process for the first time.

Further, table 450 and 460 show malicious PIR process events from P530 and P28. It is pertinent to note that these aberrant events all occurred in the 77th hour and were all caused by the same user U78@DOM1.

Figure 5A:
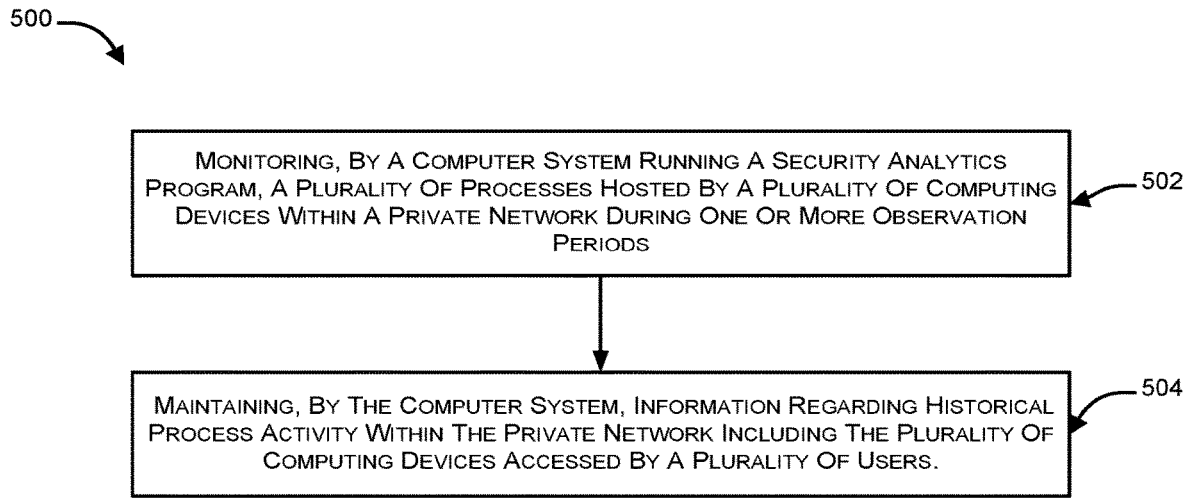
FIG. 5A is a flow diagram illustrating a process performed by a network security appliance during a training mode in accordance with an embodiment of the present invention.

FIG. 5A is a flow diagram 500 illustrating a process performed by a network security appliance during a training mode in accordance with an embodiment of the present invention. The processing described with reference to FIG. 5A may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 600 described with reference to FIG. 6 below.

In the context of the present example, at block 502, a computer system running a security analytics program monitors a plurality of processes hosted by a plurality of computing devices within a private network during one or more observation periods. At block 504, the computer system maintains information regarding historical process activity within the private network including the plurality of computing devices accessed by a plurality of users.

Figure 5B:
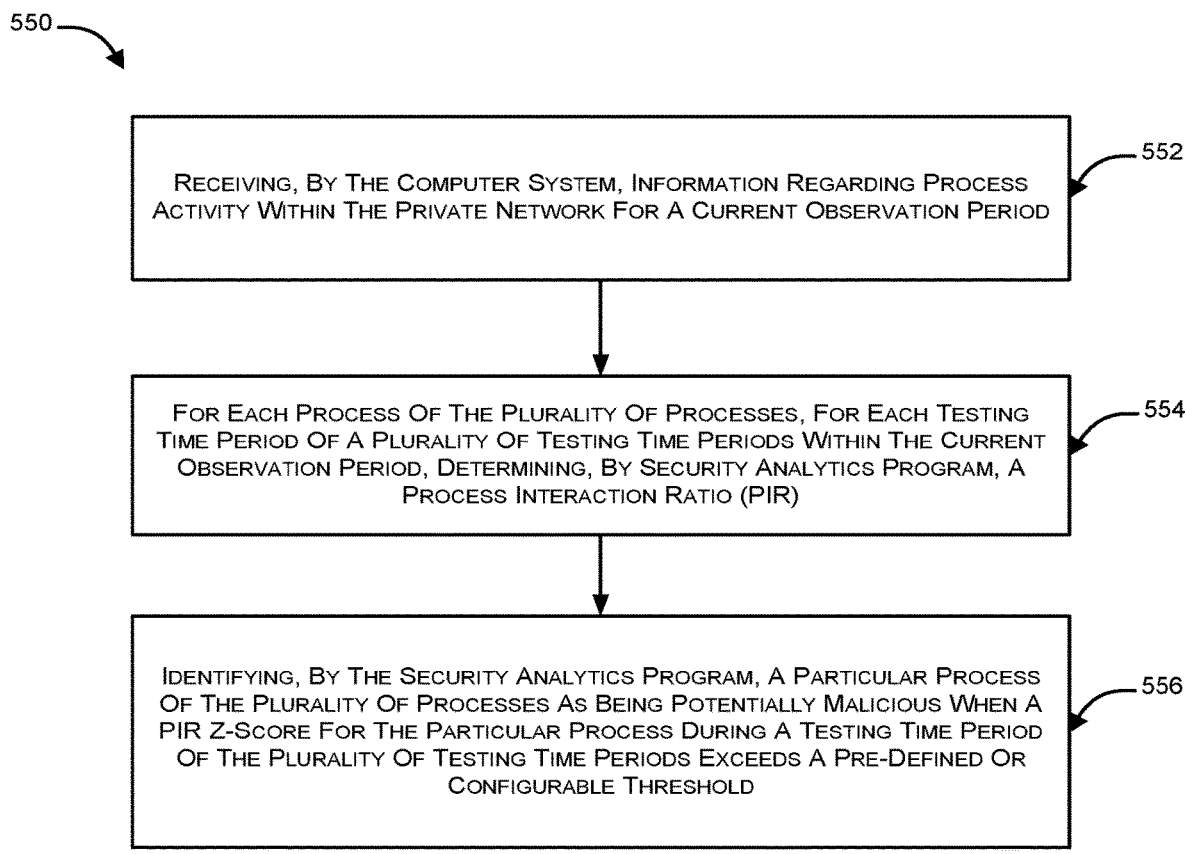
FIG. 5B is a flow diagram illustrating a process performed by a network security appliance during a monitoring mode in accordance with an embodiment of the present invention.

FIG. 5B is a flow diagram 550 illustrating a process performed by a network security appliance during a monitoring mode in accordance with an embodiment of the present invention. As above, the processing described with reference to FIG. 5B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 600 described with reference to FIG. 6 below.

In the context of the present example, at block 552, the computer system (e.g., a SIEM device) receives information regarding process activity within the private network for a current observation period. For each process of the plurality of processes, for each testing time period of a plurality of testing time periods within the current observation period, at block 554, the security analytics program determines a PIR between (i) a number of unique computing devices of the plurality of computing devices that executed the process during the testing time period; and (ii) a number of unique users of the plurality of users that executed the process during the testing time period. Further, at block 556, the security analytics program identifies a particular process of the plurality of processes as being potentially malicious when a PIR z-score for the particular process during a testing time period of the plurality of testing time periods exceeds a pre-defined or configurable threshold, where the PIR z-score is a measure of deviation of the PIR of the particular process from a historical PIR mean of the particular process.

Figure 6:
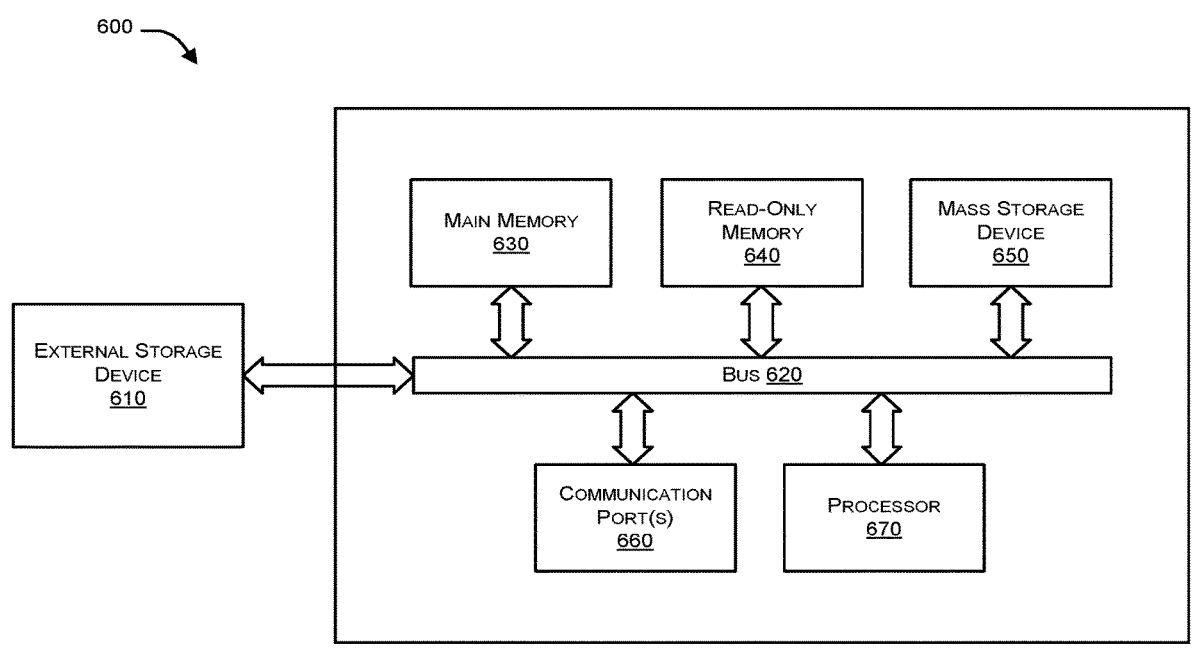
FIG. 6 illustrates an exemplary computer system in which or with which embodiments of the present invention may be utilized.

FIG. 6 illustrates an exemplary computer system in which or with which embodiments of the present invention may be utilized. FIG. 6 illustrates an exemplary computer system 600 in which or with which embodiments of the present invention can be utilized. As shown in FIG. 6, computer system includes an external storage device 610, a bus 620, a main memory 630, a read only memory 640, a mass storage device 650, a communication port 660, and a processor 670. In one embodiment, computer system 600 may represent some portion of a network device (e.g., network security appliance 104 or server 112 of FIGS. 1A-B).

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by one or more computer systems, information regarding process activity within a network during one or more time periods, wherein the information regarding process activity includes, for each time period of the one or more time periods, information indicative of which of a plurality of computing devices associated with the network executed which of a plurality of processes during the time period;
for each process of the plurality of processes, for each testing time period of the one or more time periods, determining, by the one or more computer systems, a process interaction ratio (PIR) based on (i) a number of unique computing devices of the plurality of computing devices that executed the process and (ii) a number of unique users of a plurality of users of the network that executed the process; and
identifying, by the one or more computer systems, a particular process of the plurality of processes as being potentially malicious based on a PIR z-score for the particular process exceeding a pre-defined or configurable threshold during a time period of the one or more time periods, wherein the PIR z-score is a measure of deviation of the PIR of the particular process from a historical PIR mean of the particular process.

2. The method of claim 1, further comprising incorporating, by the one or more computer systems, the information regarding process activity for the one or more time periods within historical process activity maintained by the one or more computer systems.

3. The method of claim 2, further comprising for each process of the plurality of processes, computing, by the one or more computer systems, the historical mean PIR for the process and a standard deviation of PIR for the process based on the historical process activity and PIRs calculated for the process at equal testing time periods within the historical process activity.

4. The method of claim 3, wherein the equal time periods comprise one hour.

5. The method of claim 1, further comprising after said identifying:
  determining, by the one or more computer systems, whether one or more computing devices or one or more users that caused the PIR z-score for the particular process to exceed the predefined or configurable threshold were newly introduced into the network; and
  when said determining is affirmative, confirming, by the one or more computer systems, the particular process to be malicious by:
  generating a modified PIR for the particular process that excludes any newly introduced computing device or any newly introduced users; and
  comparing the modified PIR to the PIR z-score.

6. The method of claim 1, further comprising detecting, by the one or more computer systems, an appearance of bias in relation to the PIR z-score and validating the PIR z-score using a statistical technique.

7. The method of claim 1, wherein the computer system comprises a Security Incident and Events Management (SIEM) appliance.

8. The method of claim 1, wherein the SIEM appliance is implemented in a cloud environment.

9. A non-transitory computer-readable storage medium embodying a set of instructions, which when executed by one or more processors of one or more computer systems, causes the one or more processors to:
  receive information regarding process activity within a network during one or more time periods, wherein the information regarding process activity includes, for each time period of the one or more time periods, information indicative of which of a plurality of computing devices associated with the network executed which of a plurality of processes during the time period;
  for each process of the plurality of processes, for each testing time period of the one or more time periods, determine a process interaction ratio (PIR) based on (i) a number of unique computing devices of the plurality of computing devices that executed the process and (ii) a number of unique users of a plurality of users of the network that executed the process; and
  identify a particular process of the plurality of processes as being potentially malicious based on a PIR z-score for the particular process exceeding a pre-defined or configurable threshold during a time period of the one or more time periods, wherein the PIR z-score is a measure of deviation of the PIR of the particular process from a historical PIR mean of the particular process.

10. The non-transitory computer-readable storage medium of claim 9, wherein the instructions further cause the one or more processors to incorporate the information regarding process activity for the one or more time periods within historical process activity maintained by the one or more computer systems.

11. The non-transitory computer-readable storage medium of claim 10, wherein the instructions further cause the one or more processors to for each process of the plurality of processes, compute the historical mean PIR for the process and a standard deviation of PIR for the process based on the historical process activity and PIRs calculated for the process at equal testing time periods within the historical process activity.

12. The non-transitory computer-readable storage medium of claim 11, wherein the equal time periods comprise one hour.

13. The non-transitory computer-readable storage medium of claim 9, wherein the instructions further cause the one or more processors to:
  determine whether one or more computing devices or one or more users that caused the PIR z-score for the particular process to exceed the predefined or configurable threshold were newly introduced into the network; and
  when said determining is affirmative, confirm the particular process to be malicious by:
  generating a modified PIR for the particular process that excludes any newly introduced computing device or any newly introduced users; and
  comparing the modified PIR to the PIR z-score.

14. The non-transitory computer-readable storage medium of claim 9, wherein the instructions further cause the one or more processors to detect an appearance of bias in relation to the PIR z-score and validate the PIR z-score using a statistical technique.

15. The non-transitory computer-readable storage medium of claim 9, wherein a computer system of the one or more computer systems comprises a Security Incident and Events Management (SIEM) appliance.

16. The non-transitory computer-readable storage medium of claim 9, wherein the SIEM appliance is implemented in a cloud environment.

17. A system comprising:
  one or more processing resources; and
  a non-transitory computer-readable medium, coupled to the one or more processing resources, having stored therein instructions that when executed by the one or more processing resources cause the one or more processing resources to:
  receive information regarding process activity within a network during one or more time periods, wherein the information regarding process activity includes, for each time period of the one or more time periods, information indicative of which of a plurality of computing devices associated with the network executed which of a plurality of processes during the time period;
  for each process of the plurality of processes, for each testing time period of the one or more time periods, determine a process interaction ratio (PIR) based on (i) a number of unique computing devices of the plurality of computing devices that executed the process and (ii) a number of unique users of a plurality of users of the network that executed the process; and
  identify a particular process of the plurality of processes as being potentially malicious based on a PIR z-score for the particular process exceeding a pre-defined or configurable threshold during a time period of the one or more time periods, wherein the PIR z-score is a measure of deviation of the PIR of the particular process from a historical PIR mean of the particular process.

18. The system of claim 17, wherein the instructions further cause the one or more processing resources to incorporate the information regarding process activity for the one or more time periods within historical process activity maintained by the system.

19. The system of claim 18, wherein the instructions further cause the one or more processing resources to for each process of the plurality of processes, compute the historical mean PIR for the process and a standard deviation of PIR for the process based on the historical process activity and PIRs calculated for the process at equal testing time periods within the historical process activity.

20. The system of claim 17, wherein the instructions further cause the one or more processing resources to:
    determine whether one or more computing devices or one or more users that caused the PIR z-score for the particular process to exceed the predefined or configurable threshold were newly introduced into the network; and
    when said determining is affirmative, confirm the particular process to be malicious by:
    generating a modified PIR for the particular process that excludes any newly introduced computing device or any newly introduced users; and
    comparing the modified PIR to the PIR z-score.

* * * * *